Patented Dec. 22, 1942

2,305,643

UNITED STATES PATENT OFFICE 2,305,643

ART OF PRESERVING GREEN FOODSTUFFS AND MAINTAINING THE COLOR THEREOF

Arthur E. Stevenson and Keith T. Swartz, Chicago, Ill., assignors to Continental Can Company, Inc., New York, N. Y., a corporation of New York No Drawing. Continuation of application Serial No. 341,778, June 21, 1940. This application January 5, 1942, Serial No. 425,698

13 Claims. (Cl. 99—186)

This invention relates to the preservation of foodstuffs having green color, which it is desired to maintain during the course of preservation and storage.

This application is a continuation of and substitute for the copending application Serial No. 341,778, filed June 21, 1940.

The chlorophyll of green vegetables is known to be readily decomposed or modified by the action of heat. This change takes place rapidly in the presence of acids, and even the small amounts of naturally occurring acids in green vegetables cause rapid decomposition of the chlorophyll during the sterilization of canned foods prepared from them. For many years it has been known that the addition of sufficient alkali to the product to bring the pH of the brine, or liquid surrounding the sterilized canned product, to a point of 7.0 or slightly above would lessen the destruction of chlorophyll during sterilization and subsequent storage in the can. The main difficulty has been to select an alkali which in use would not constitute a health hazard to the consumer and which would accomplish the desired change in pH without appreciably affecting the desired flavor or texture of the product. For example, calcium hydroxide possesses satisfactory properties for accomplishing this purpose in that it is non-toxic and in that the calcium ion has a hardening or toughening effect on the foodstuff which tends to counteract the softening effect of the hydroxyl ion. However, on account of its limited solubility in water, and the difficulty in dissolving calcium hydroxide, it is not always possible to add a sufficient amount of an aqueous solution of this compound to the brine in the can for accomplishing the desired change in pH.

It has also previously been proposed to blanch and otherwise treat green foodstuffs such as green peas, spinach, and the like, with alkaline solutions for the purpose of preventing deterioration of color incident to the heating. Lime water, and sodium carbonate and bicarbonate solutions have been proposed for this purpose.

Similarly, it has been proposed to employ various other alkalies during the blanching and sterilizing treatments.

It has further been found that the use of an alkali metal in alkaline form, such as solutions of sodium and potassium hydroxides, carbonates and bicarbonates, leads to a softening of the substance of the foodstuff, particularly of the structure or form-maintaining portions such as the envelope or skin of green peas. On the other hand, when green peas are subjected to a treatment with a strongly alkaline solution of a calcium compound, the envelopes or skins may quickly become so toughened that the product is objectionable for this reason, but without at the same time producing a sufficient alkalinity within the pulp itself in adjacency or association with the coloring matter which is to be preserved.

It has now been found that a desirable condition of green peas and similar green vegetables, both with respect to color and physical condition, can be effected by establishing an alkaline reserve within the foodstuff; and that a sufficient alkaline reserve can be built up so that it is no longer necessary to utilize an alkaline liquor as a blanching agent preliminary to the placing of the foodstuff in the final container, and in some instances this alkaline reserve is sufficient to eliminate the necessity of including an alkalizing agent in the final brine.

This result is attained by a pre-treatment of the green vegetable with an alkaline solution of such a concentration and for such a time that the alkaline reserve is established to a point for assuring continuance thereof during the course of the blanching treatment at least without the introduction of further alkali into the blanching liquor.

There is also comprised herein, particularly for easily-softened foodstuffs, the employment of an alkaline solution having both a base or cation of an alkali metal (sodium or potassium) and also including a sufficient concentration of available calcium to offset the normal leaching of calcium compounds from the foodstuff. Considered theoretically, the concentration of calcium is effective to prevent an excessive loss of calcium from the envelope or skin (in which the highest concentration of calcium is present), while the high hydroxyl concentration (high pH) resulting from the alkalinity of the alkali metal compound is effective to establish within the pea an alkaline reserve of high order.

As specific examples of practice of the procedure may be set out the following:

Example I

A solution is prepared having a strength in sodium hydroxide of one-tenth to one-fifth normal (N/10 to N/5). Green peas are prepared by shelling, and then the above liquor is poured over them and they are held totally immersed therein at room temperature. The duration of this soaking depends upon the condition of the peas and upon the effective alkaline concentration. It has been found that such a treatment for thirty minutes with N/10 sodium hydroxide solution is satisfactory for peas as normally received for canning: while three to fourteen minutes may be employed with N/5 sodium hydroxide solution.

The peas are withdrawn from the soaking solution, thoroughly washed, and are then blanched in hot water at substantially 190 degrees F. for approximately three minutes, without the addition of alkali to the water. The peas are withdrawn from the blanching liquor, rinsed, and then filled into cans or other containers with a brine containing sugar and salt and approximately 3.0 grams of magnesium oxide per gallon (roughly 11 ounces per 100 gallons). The cans are sealed and then processed. Processing at a high temperature, such as 260 degrees F., for a short time, gives a better retention of color than processing at 240 degrees F. for the time generally used in the canning of peas.

Example II

A solution is prepared having a strength in sodium hydroxide of one-tenth to one-fifth normal (N/10 to N/5), and calcium oxide is added in the amount of 2 to 6 grams per gallon. The solution, at room temperature, is then poured over shelled peas to submerge the same: the duration of the soaking depends upon the condition of the peas and upon the effective alkaline concentration. With peas in the normal condition for canning, it has been found that a treatment for thirty minutes with N/10 sodium hydroxide concentration of initial solution (exclusive of calcium content) is satisfactory, while three to fourteen minutes is an advantageous time with N/5 sodium hydroxide concentration. This alkaline solution establishes an alkaline reserve of relatively high pH value in the peas, without degradation or softening of the envelopes or skins.

The peas are separated from the soaking solution, thoroughly washed, and then immersed in hot water and blanched for approximately three minutes at substantially 190 degrees F., this blanching water being of the normal purity as employed in commercial canneries. In particular, it is not necessary to add alkali to this water. The peas are withdrawn, rinsed, and then filled in the cans or other containers with a brine containing sugar and salt and approximately 3.0 grams of magnesium oxide per gallon. The cans are sealed and then processed as before.

Example III

The procedure as in Example II is followed, except that the soaking solution for initial treatment at room temperature is made by preparing a sodium hydroxide solution of N/10 to N/5 concentration, and then adding to it a soluble calcium salt such as the chloride, until milkiness indicates precipitation of calcium hydroxide. This solution is then immediately ready for employment, and its preparation has the advantage over that of Example II above that an assured content or saturation of the solution with calcium hydroxide occurs.

Example IV

A solution is prepared having a strength in sodium hydroxide of one-fifth normal (N/5). Green peas are prepared by harvesting the vines, and shelling the peas. The above liquor is poured over the peas after rejecting obviously oversize, immature and broken peas, and they are held totally immersed therein at room temperature for six or seven minutes. The peas are withdrawn from the pre-soaking solution, thoroughly washed and transferred to hot water at 190 degree F. where they are held for approximately three minutes for blanching. The blanching water contains no added alkali. The peas are withdrawn from the blanching liquor, rinsed, and filled into the packing containers with a brine containing sugar, salt and approximately 1.5 grams of magnesium oxide per gallon. The containers are sealed and processed at 260 degrees F. for a short time. The product after twenty-four hours has a pH value of about 8.3, and can retain color and desirable characteristics for many months.

In determining the concentration of the alkali and the time of soaking for establishing the alkaline reserve, consideration should be given to the variety, size, maturity, etc., of the peas. With an N/5 solution, from three to six minutes has been found desirable in soaking sweet varieties of peas, while this soaking phase must sometimes be extended as much as fourteen minutes to the Alaska variety of peas, for a given concentration of alkali in the final brine or sauce. The size of the container may sometimes have an influence upon the desirable concentration of the pre-soaking liquor and upon the time to be employed, for the reason that a longer time is usually required for processing the contents of a large container than is required for those of a small container, and it is usually found that the relative loss of alkalinity is a function of the time of heating for sterilizing. The above examples were based on practice with No. 2 cans.

In some instances, the size of the peas as prepared for canning has an influence upon selection of the desirable concentrations and times for the treatment. Thus, it has been found advantageous to pass the peas through a sorting screen, and to treat the peas individually in accordance with their sizes. This practice is presently followed by some canners in grading their products. In determining the effect of pre-soaking with alkali, the following determinations with California-grown market peas indicate the rate and nature of the change upon soaking these fresh peas in N/5 sodium hydroxide solution:

| Time of soak (minutes) | Sieve 2 (and under) | Sieve 3 | Sieve 4 | Sieve 5 |
|---|---|---|---|---|
| Fresh peas | 6.15 | 6.40 | 6.55 | 6.40 |
| 3 | 6.70 | 7.20 | 8.60 | 8.30 |
| 6 | 7.05 | 8.50 | 8.95 | 8.85 |
| 9 | 7.50 | 8.85 | 9.25 | 9.40 |
| 12 | 7.85 | 9.00 | 9.70 | 9.60 |
| 15 | 8.20 | 9.00 | 9.90 | 9.70 |
| 18 | 8.40 | 9.50 | 9.90 | 10.30 |
| 21 | 8.55 | 9.60 | 9.90 | 10.35 |
| 24 | 8.65 | 9.65 | 10.15 | 10.60 |
| 27 | 8.60 | 9.70 | 10.15 | 10.55 |
| 30 | 8.75 | 9.90 | 10.60 | 10.50 |

With many varieties of cannery peas, "sieve 2" size is originally deficient in color, and canning thereof as "green peas" is not commercially desirable. With certain varieties, "sieve 4" peas are the smallest which it has been presently found advantageous to can by the present procedure. It is therefore recommended to inspect and test each variety and size for color and color maintenance.

This behavoir of the larger and smaller sizes of the peas, however, is not uniform, and it is usually possible to can peas, under the conditions they are normally introduced to the canning operation, without necessity of grading for size so long as obviously defective peas are excluded by reason of lack of maturity, over-ripeness, broken skins, etc. In some instances, it has even been found that upon treating peas which have been sorted for size, with employment of identical concentrations and times for pre-soaking, identical blanching treatment, and identical brines and processing times, the smaller sizes of peas demonstrated at the end of 24 hours after processing an alkalinity which was relatively higher than that of the larger sizes.

It has been found that a limitation upon the total quantity of magnesium which can be successfully employed in the brine, on a commercial basis, is established by the possible development of struvite, which forms as hard white crystals of magnesium ammonium phosphate. In some instances, even with high magnesium concentrations, the canned peas remain unobjectionable from this viewpoint for as long as a year, while in other cases, this period may be as short as three or four months with the same concentration. For assuring satisfactory maintenance of condition during storage, it is preferred to hold the magnesium concentration per gallon of brine at around 3.0 grams, or below (preferably around 1.5 grams), when the normal quantity of brine is employed for the particular size of can. However, with the lower amounts of magnesium in the brine, it is necessary to establish a higher initial alkaline reserve during the pre-soaking period, and this is usually accomplished by employing N/5 sodium hydroxide solution for three to eight minutes for the "Perfection" variety of sweet peas when the vines are harvested at the normal season. One phase of the present treatment, therefore, is this capability of establishing an initial alkaline reserve which is effective with a suitable final brine for maintenance of proper color over an extended storage period, and without difficulty of deleterious changes in the product by way of objectionable mushiness, objectionable hardness, objectionable toughness, the formation of crystals, the existence of such a pH condition as may make the product objectionable in taste at any time during its probable storage life, or the introduction of chemical elements abnormal to the natural product.

In view of the variables involved depending upon the variety, size of pea, size of can, etc., it is recommended that preliminary tests be made and that the course of the treatment be observed and checked in accordance with pH values. Since the purpose of the treatment is to establish an initial alkaline reserve sufficient to keep the peas at a concentration above pH 7.0 for the normal storage period, in spite of the gradual drop of pH values during storage, it is desirable to bring the relative alkalinity after the pre-soaking treatment to a point between pH 8.0 and pH 9.0, preferably pH 8.5 in pre-soaking the peas for brines containing 3.0 grams of magnesium oxide per gallon; and to bring this alkalinity to about pH 8.5 to 10, preferably 9.0, for preparation with brine containing 1.5 grams of magnesium oxide per gallon. This greater reserve alkalinity obtained by a greater pre-soaking effect, permits the employment of the relatively lower alkalinity of the latter brine.

A particular condition of the treatment is that this alkaline reserve is initially established, and then the relative alkalinity tends to decrease during processing and storage. For example, the alkalinity immediately after soaking may be from pH 9.40 to 9.50, and this will decrease so that after processing, an alkalinity of pH 8.30 or 8.35 will appear; while upon testing, one day after processing this will have decreased to, say, pH 8.25 or 8.30.

By the employment of N/5 sodium hydroxide solution, the pre-soaking can be accomplished within a short time, as set out above; and it has been found that under such conditions the reserve may be of varying degrees at different parts of the pea, as the time of soaking is not sufficient to establish equilibrium between the peas and the solution. The alkaline reserve within the peas tends to equalize and, during the course of a normal canning treatment, the equilibrium between peas and brine is probably not reached until after processing and cooling have been accomplished, and the can has been in storage for some hours.

In determining the pH values, as reported in the above description, the practice has been to grind the peas in a little water to form a puree, and then this mass was subjected to the test, so that the result essentially represents the equalized value at the time of testing.

In controlling the operations by taking pH readings, it is sought to employ concentrations and times so that the canned peas, after 24 hours, will have a pH value between 8.0 and 8.30, as this concentration has a satisfactory flavor and has the capability of retaining a green color over a desirable storage period.

The length of time required for blanching will also vary with the condition of the peas, but is preferably standardized at around 3 to 3½ minutes. It is desired to keep this operation as short as feasible, since lengthy operations under the stated conditions lead to a reduction of the alkaline reserve. The time should not exceed seven minutes.

Particularly with older peas, it is feasible to have the calcium concentration of the relatively cold soaking solution at a low level. Whereas with the more tender products it is desirable to have the calcium concentration at a level which is not lower than that at which calcium is prevented from being leached out of the foodstuff, it is feasible, when the envelope or skin is relatively more tough, to employ a lower calcium concentration and thereby effect a relative softening of the envelope or skin during the course of the soaking and blanching operations; although, obviously, this should not be carried to the extent of producing a degradation of the skins to the point where they are so softened as to become ruptured in the course of the mechanical handling and cooking. Such solutions may be produced by the methods of Examples II and III, followed by dilution with further sodium hydroxide solution; or the proper quantity of alkaline earth compound may be added directly.

By way of indication of the effect of alkaline solution upon the calcium and magnesium content of peas, the following tabulation sets out the effects of pouring the solutions, immediately upon preparation, over peas, and maintaining the same for a time stated.

| Treatment | Calcium content | Magnesium content |
|---|---|---|
| | Parts per million | Parts per million |
| None (control sample) | 200 | 328 |
| Soaked 15 minutes at room temperature in N/5 NaOH | 196 | 302 |
| Soaked in N/5 NaOH to which had been added .3985 gram calcium chloride per liter, for 15 minutes at room temperature | 247 | 299 |
| Soaked in N/5 NaOH to which had been added .1086 gram calcium chloride per liter for 15 minutes at room temperature | 197 | 304 |
| Soaked in N/5 NaOH to which had been added 4 grams CaO per liter for 15 minutes at room temperature | 311 | 313 |

From this, it will be noted that soaking in an alkali solution produces only a slight lowering of calcium content, and that this content is actually increased when higher concentrations of calcium are present. Thus, 0.3985 gram of calcium chloride per liter is sufficient to saturate the solution with calcium hydroxide in the presence of the caustic soda solution and provide an excess thereof; while 0.1086 gram of calcium chloride per liter theoretically gives a concentration equivalent to half saturation. Where 4 grams of calcium oxide were added per liter, this was considerably more than enough to saturate the solution with calcium hydroxide; and it will be noted that with this solution or suspension, the calcium content of the peas was considerably increased. It thus would appear that the peas take up the calcium which is in solution, and then more calcium goes into solution and is in turn taken up by the peas, so that the final result is a gradual transfer to the peas of the calcium which was originally present as insoluble calcium oxide.

Further, it will be noted that there is likewise a very small degree of change in the magnesium content, although the actual loss appears least when an excess of calcium oxide was employed. The other results as to magnesium content indicate generally a drop from 328 parts per million to approximately 300 parts per million.

It has been found that the soaking at low temperature should continue for a time of three to thirty minutes, depending upon the maturity of the peas, their size, and the strength of the alkaline solution. It is desirable to grade the peas by maturity and size, to assure uniform results, although this is not necessary. The concentration of the sodium hydroxide should be substantially N/10 to N/5, although N/20 solutions are effective if a correspondingly longer time of soaking is allotted. Calcium oxide or hydroxide, when added, should be added in sufficient quantity to give the peas the necessary firmness for the succeeding blanching and canning operations.

The blanching operation may be conducted with commercially pure water, i. e., a substantially neutral agent, at a temperature of substantially 180 to 200 degrees F. and for a time of three to seven minutes with commercial green peas.

The brine which is introduced with the blanched peas into the final container may include sugar and salt in the usual way, such as a brine of 2 percent salt and 3 percent sugar, and should have a concentration of magnesium oxide of 1.5 to 4.5 grams per gallon, the lower value being preferred when the probable storage period will be long. It has been found feasible to utilize calcium oxide to replace a part of the magnesium oxide in the final brine, but care should be taken to avoid the employment of a large proportion of calcium oxide as the product is impaired due to a precipitate or cloudiness which appears in the brine since the calcium oxide does not go into solution as well as magnesium oxide, in the necessary quantities. The hydroxides may be similarly used, and are herein considered as oxides.

The soaking solution for use at low temperature can utilize potassium hydroxide as a full or partial replacement of sodium hydroxide; and it is likewise feasible to produce at least a part of the alkali metal concentration in the soaking solution by employment of carbonates, due care being taken that the amount of available calcium compound, if used in the soaking solution, shall be adequate to prevent excessive leaching of calcium from the foodstuff; but it is presently preferred to utilize the more caustic alkalies as they produce the desired hydroxyl concentration with the least introduction of additional matters, even though these matters are essentially comprised only of the chemical elements or compounds occurring normally in the foodstuff as grown or as presently preserved.

It is obvious that other modifications may be made in the practice of the art, without departing from the scope of the appended claims.

We claim:

1. The process of preserving peas and other green foodstuffs and retaining the color thereof, which includes soaking the foodstuff for substantially three to thirty minutes at substantially room temperature in an alkaline solution containing an alkali metal hydroxide in a concentration substantially of N/5 to N/10, blanching in a substantially neutral aqueous bath at a temperature of substantially 180 degrees F., and thereafter processing in a sealed container.

2. The process of preserving peas and other green foodstuffs and retaining the color thereof, which includes soaking the foodstuff for substantially three to thirty minutes at substantially room temperature in an alkaline solution containing an alkaline earth compound to the extent of substantial saturation of the solution with alkaline earth hydroxide, and also containing an alkali metal hydroxide in a concentration substantially of N/5 to N/10, blanching in a neutral aqueous bath at a temperature of substantially 180 degrees F., and thereafter processing in a sealed container.

3. The process of preserving peas and other green footstuffs and retaining the color thereof, which includes soaking the foodstuff at substanially room temperature in an alkaline solution containing an alkali metal hydroxide in a concentration of N/5 to N/10, blanching in water at a temperature of substantially 180 degrees F., and thereafter processing in a sealed container in the presence of a brine containing an alkaline earth oxide.

4. The process of preserving peas and other green foodstuffs and retaining the color thereof, which includes soaking the foodstuff at substantially room temperature in an alkaline solution containing a calcium compound to the extent of substantial saturation of the solution with calcium hydroxide, and also containing an alkali metal hydroxide in a concentration of N/5 to N/10, blanching in water at a temperature of substantially 180 degrees F., and thereafter processing in a sealed container in the presence of a brine containing an alkaline earth oxide.

5. The process of preserving peas and other green foodstuffs and retaining the color thereof, which includes soaking the foodstuff at substantially room temperature in an alkaline solution containing an alkali metal hydroxide in a concentration of N/5 to N/10, blanching in water at a temperature of substantially 180 degrees F., and thereafter processing in a sealed container in the presence of a brine containing magnesium oxide in 1.5 to 4.5 grams per gallon molar concentration.

6. The process of preserving peas and other green foodstuffs and retaining the color thereof, which includes soaking the foodstuff at substantially room temperature in an alkaline solution containing an alkaline earth compound to the extent of substantial saturation of the solution with alkaline earth hydroxide, and also containing an alkali metal hydroxide in a concentration of N/5 to N/10, blanching in water at a temperature of substantially 180 degrees F., and thereafter processing in a sealed container in the presence of a brine containing magnesium oxide in 1.5 to 4.5 grams per gallon molar concentration.

7. The process of preserving peas and other green foodstuffs and retaining the color thereof, which includes soaking the foodstuff at substantially room temperature in an alkaline solution containing a calcium compound in an amount in excess of that necessary for saturation of the solution with calcium hydroxide, and also containing an alkali metal hydroxide in a concentration of N/5 to N/10, washing with water, blanching in water at a temperature of substantially 180 degrees F., and thereafter processing in a sealed container in the presence of a brine containing an alkaline earth oxide.

8. The process of preserving peas and other green foodstuffs and retaining the color thereof, which includes soaking the foodstuff at substantially room temperature in an alkaline solution having a concentration of substantially N/5 to N/10 alkali metal hydroxide and also containing calcium hydroxide in quantity sufficient to prevent substantial leaching of calcium from the foodstuff, blanching in water at a temperature of substantially 180 to 210 degrees F., and thereafter processing a sealed container in the presence of a brine containing alkaline earth oxide.

9. The process of preserving peas and other green foodstuffs and retaining the color thereof, which includes soaking the foodstuff at substantially room temperature in an alkaline solution having a hydroxyl concentration equal to that of N/5 to N/10 alkali metal hydroxide and also containing a calcium compound in quantity sufficient to prevent substantial leaching of calcium from the foodstuff, washing with water, blanching in water at a temperature of substantially 180 to 210 degrees F., and thereafter processing in a sealed container in the presence of a brine containing magnesium oxide.

10. The process of preserving peas and other green foodstuffs and retaining the color thereof, which includes soaking the foodstuff for three to thirty minutes at substantially room temperature in an alkaline solution having a hydroxyl concentration equal to that of N/5 to N/10 alkali metal hydroxide and also containing a calcium compound in quantity sufficient to prevent substantial leaching of calcium from the foodstuff, blanching for three to seven minutes in water at a temperature of substantially 180 to 210 degrees F., and thereafter processing in a sealed container in the presence of a brine.

11. The process of preserving peas and other green foodstuffs and retaining the color thereof, which includes preparing a solution of N/5 to N/10 alkali metal hydroxide, adding thereto a soluble calcium salt in quantity to establish a substantial saturation of the solution with calcium hydroxide, soaking the foodstuff in the said solution at substantially room temperature for three to thirty minutes, blanching the foodstuff in water at a temperature of substantially 180 to 210 degrees F., and thereafter processing in a sealed container in the presence of a brine containing an alkaline earth oxide.

12. The process of preserving peas and other green foodstuffs and retaining the color thereof, which includes preparing a solution of N/5 to N/10 alkali metal hydroxide, adding thereto a soluble calcium salt in quantity to establish a substantial saturation of the solution with calcium hydroxide, soaking the foodstuff in the said solution at substantially room temperature for three to thirty minutes, blanching the foodstuff in water at a temperature of substantially 180 to 210 degrees F., washing, and thereafter processing in a sealed container in the presence of a brine containing magnesium oxide.

13. The process of preserving peas and other green foodstuffs and retaining the color thereof, which comprises soaking the foodstuff for three to fourteen minutes at substantially room temperature in an alkaline solution containing an alkali metal hydroxide in a concentration of substantially N/5 for establishing an alkalinity of pH 8.5 to 10, blanching in a substantial neutral aqueous bath at a temperature of substantially 180 degrees F., and thereafter processing in a sealed container in the presence of a brine containing an alkaline earth oxide, the alkalinity of the material being maintained so that its value is substantially between pH 8.0 and 8.30 at 24 hours after completion of processing.

ARTHUR E. STEVENSON.
KEITH T. SWARTZ.